United States Patent
Latham

(10) Patent No.: US 11,953,395 B2
(45) Date of Patent: Apr. 9, 2024

(54) MAGNETIC FIELD DIFFERENTIAL LINEAR TORQUE SENSOR

(71) Applicant: Allegro MicroSystems, LLC, Manchester, NH (US)

(72) Inventor: Alexander Latham, Harvard, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 113 days.

(21) Appl. No.: 17/655,469

(22) Filed: Mar. 18, 2022

(65) Prior Publication Data

US 2023/0296459 A1    Sep. 21, 2023

(51) Int. Cl.
*G01L 3/10*    (2006.01)

(52) U.S. Cl.
CPC ..................... *G01L 3/104* (2013.01)

(58) Field of Classification Search
CPC ........................................ G01L 3/104
See application file for complete search history.

(56) References Cited

U.S. PATENT DOCUMENTS

| | | | |
|---|---|---|---|
| 6,912,923 B2 | 7/2005 | Froehlich et al. | |
| 7,845,244 B2 * | 12/2010 | Aoki .................. | G01L 3/104 73/862.331 |
| 8,453,518 B2 | 6/2013 | Diekmann et al. | |
| 8,844,380 B2 * | 9/2014 | Takahashi ............. | B62D 6/10 73/862.193 |
| 9,970,834 B2 * | 5/2018 | Ishimoto ................ | G01L 3/101 |
| 10,634,568 B2 * | 4/2020 | Rey ......................... | G01L 3/104 |
| 10,866,117 B2 | 12/2020 | Kozomora et al. | |
| 11,163,019 B1 | 11/2021 | Chaware et al. | |

(Continued)

FOREIGN PATENT DOCUMENTS

| | | |
|---|---|---|
| DE | 203 05 732 U1 | 7/2003 |
| DE | 10 2008 006 865 A1 | 8/2009 |

(Continued)

OTHER PUBLICATIONS

International Search Report and Written Opinion dated May 9, 2023 for PCT International Application No. PCT/US2023/060802; 14 pages.

(Continued)

*Primary Examiner* — Octavia Davis Hollington
(74) *Attorney, Agent, or Firm* — DALY, CROWLEY, MOFFORD & DURKEE, LLP

(57) ABSTRACT

Differential magnetic field torque sensors include first and second magnetic field concentrators that guide magnetic flux to a magnetic field sensor from first and second magnetic field directors and a target, such as a multipole magnet assembly configured as a ring magnet. The magnetic field concentrators have pairs of sections that are interdigitated and configured adjacent to magnetic field sensing elements of the magnetic field sensor. The magnetic field directors can each have a plurality of teeth, which can be interdigitated and adjacent or proximate to the target. The magnetic field directors can be configured to be mounted as a unit to a rotatable shaft while the target can be configured to be mounted to a different rotatable shaft. The magnetic field concentrators and magnetic field sensor can be fixed while the magnetic field directors and target can rotate with respect to each other about a twist axis.

28 Claims, 6 Drawing Sheets

(56) References Cited

U.S. PATENT DOCUMENTS

| | | |
|---|---|---|
| 11,215,681 B2 | 1/2022 | David et al. |
| 11,579,031 B2 * | 2/2023 | Bilbao De Mendizabal ............... G01L 3/104 |
| 2004/0011138 A1 | 1/2004 | Gandel et al. |
| 2013/0152702 A1 | 6/2013 | Takahashi et al. |
| 2016/0214648 A1 | 7/2016 | Schoepe et al. |
| 2020/0158795 A1 | 5/2020 | Suzuki et al. |
| 2020/0217731 A1 * | 7/2020 | Toyama ............... B62D 15/022 |
| 2020/0400516 A1 * | 12/2020 | Bilbao De Mendizabal ............... G01R 33/091 |
| 2021/0262777 A1 | 8/2021 | Lassalle-Balier et al. |
| 2021/0262831 A1 | 8/2021 | Foletto et al. |
| 2022/0075008 A1 | 3/2022 | Romero |
| 2022/0136918 A1 * | 5/2022 | Frachon ................... B62D 6/10 73/862.325 |
| 2022/0146346 A1 | 5/2022 | Frachon |
| 2022/0357144 A1 | 11/2022 | Tombez |

FOREIGN PATENT DOCUMENTS

| | | | | | |
|---|---|---|---|---|---|
| DE | 102016200209 A1 * | 7/2016 | ............. | G01L 3/104 |
| JP | 2011089783 A * | 5/2011 | ............. | G01L 3/104 |
| WO | WO 2006/008425 A1 | 1/2006 | | |

OTHER PUBLICATIONS

U.S. Appl. No. 17/651,265, filed Feb. 16, 2022, Ostermann, et al.
Didier Angleviel, Didier Franchon, Gérald Masson, Development of a Contactless Hall effect torque sensor for Electric Power Steering, 2005 SAE International, 8 pages.

\* cited by examiner

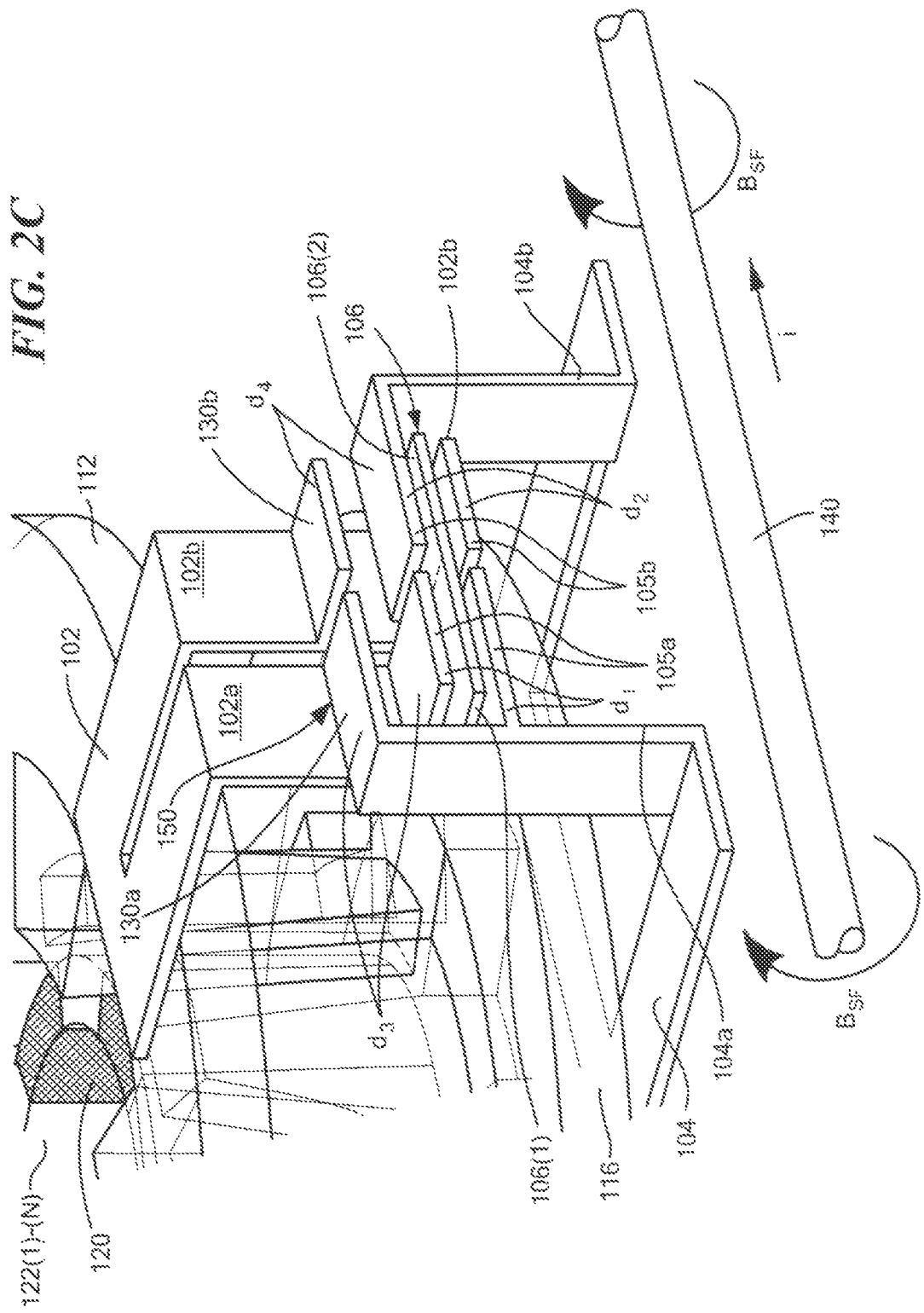

MAGNETIC FIELD DIFFERENTIAL LINEAR TORQUE SENSOR

BACKGROUND

Magnetic field sensors can be used in a variety of applications. In one application, a magnetic field sensor can be used to detect an angle of rotation of an object. In another application, a magnetic field sensor can be used to sense a rotation (e.g., a continuous or discontinuous rotation) of an object.

Various magnetic field sensing elements can be used within magnetic field sensors. For example, planar Hall effect elements and vertical Hall effect elements are known types of magnetic field sensing elements. A planar Hall effect element tends to be responsive to magnetic fields perpendicular to a surface of a substrate on which the planar Hall effect element is formed. A vertical Hall effect element tends to be responsive to magnetic fields parallel to a surface of a substrate on which the vertical Hall effect element is formed. Magnetoresistance elements are also known types of magnetic field sensing elements that are used for magnetic field sensors. Some types of magnetoresistance elements tend to be responsive to magnetic fields parallel to a surface of a substrate on which the magnetoresistance element is formed.

Various parameters characterize the performance of magnetic field sensing elements and magnetic field sensors that use magnetic field sensing elements. These parameters include sensitivity, which is a change in an output signal of a magnetic field sensing element in response to a change of magnetic field experienced by the magnetic sensing element, and linearity, which is a degree to which the output signal of the magnetic field sensing element varies in direct proportion to the magnetic field. These parameters also include an offset, which is characterized by an output signal from the magnetic field sensing element not representative of a zero magnetic field when the magnetic field sensing element experiences a zero magnetic field.

Stray magnetic fields caused by other sources such as magnetic components or electric currents can interfere with the performance of magnetic field sensors and sensing elements. Such stray magnetic fields may pose significant problems in applications, e.g., automotive, where electric motors, batteries, and other electromagnetic components are used. For example, electric motors that drive electric vehicles ("EVs") and hybrid electric vehicles ("HEVs") typically require significant amounts of electric current, and therefore produce strong magnetic fields around the cables delivering the electric current from the battery or alternator to the motor. Other common lower-current components can also generate significant stray magnetic fields in automotive applications, e.g., electronic power steering ("EPS") pumps, electric windows or sunroofs, and any other electrically actuated devices used in the vehicles. Because stray magnetic fields can affect the accuracy of the magnetic fields sensors and can cause significant output errors for such sensors, systems and signal processing relying on such sensors can likewise be negatively impacted by stray magnetic fields.

SUMMARY

Embodiments of the present disclosure provide systems, methods, and apparatus for differential angle and/or torque sensing with sensors that tend to reject and/or are resistant to stray magnetic fields.

An example differential magnetic field torque sensor can include a multipole magnet assembly configured for coupling to a first rotatable shaft. The sensor can include first and second magnetic field directors positioned adjacent the multipole magnet assembly and configured to affect magnetic flux from the multipole magnet assembly. The first and second magnetic field directors can be configured for coupling as a unit to a second rotatable shaft. First and second magnetic field concentrators are configured to concentrate the magnetic flux from the multipole magnet assembly. Each magnetic field concentrator can have first and second sections that are offset from one another. A magnetic field sensor includes first and second magnetic field sensing elements, each configured to measure magnetic flux and to produce an output signal based on measured changes in magnetic flux due to relative angular motion between the multipole magnet assembly and the first and second magnetic field directors. The output signal can be indicative of torque applied to the first or second rotatable shafts. Each section of each concentrator can be interdigitated with a section of the other concentrator, forming two interdigitated pairs of sections. Each interdigitated section pair can be configured to receive a respective magnetic field sensing element. Either or both of the interdigitated section pairs can include a shield configured to shield the respective magnetic sensing element from stray magnetic fields.

The first shaft can be coupled to the second shaft by an elastic member. The elastic member can include a torsion bar. The multipole magnet assembly can be configured as a ring magnet and include a plurality of magnetic domains disposed in a cylindrical configuration, each having an opposite polarity with respect to an adjacent magnetic domain. The first and second magnetic field directors can each include a plurality of teeth. The multipole magnet assembly can be configured as a toroidal body. The first and second magnetic field directors can each be disposed around a circumference of the toroidal body. The teeth of the first magnetic field director can be spaced apart from and interdigitated with the teeth of the second magnetic field director. The magnetic sensor can be coupled to a housing that is stationary relative to the first and second rotatable shafts. The first and second magnetic field concentrators can be coupled to the housing.

The sensor can include a sum unit configured to receive an output signal from each magnetic field element and to subtract one magnetic field element output signal from the other, wherein the sum unit is configured to produce an output signal indicative of angular displacement of the multipole magnet assembly relative to the first and second magnetic field directors, and wherein effects of stray magnetic fields on the first and second magnetic field sensing elements are mitigated. The first and second rotatable shafts can include or be part of a steering column. The magnetic field sensing elements can include Hall effect elements. The magnetic field sensing elements can include magnetoresistance elements.

An exemplary embodiment of a differential magnetic field sensor can include a target configured for coupling to a first rotatable shaft and first and second magnetic field directors positioned adjacent the target and configured to affect magnetic flux from the target. The first and second magnetic field directors can be configured for coupling as a unit to a second rotatable shaft. The sensor can include first and second magnetic field concentrators can be configured to concentrate the magnetic flux from the target. Each magnetic concentrator can have first and second sections that are offset from one another. The sensor can include a magnetic field sensor having first and second magnetic field sensing elements. Each magnetic field sensing element can be configured to measure magnetic flux and to produce an output signal indicative of measured changes in magnetic flux due to relative angular motion between the target and the first and second magnetic field directors. Each section of each concentrator can be interdigitated with a section of the other concentrator, forming two interdigitated pairs of sections. Each interdigitated section pair can be configured to receive a respective magnetic field sensing element. Either or both of the interdigitated section pairs can include a shield configured to shield the respective magnetic sensing element from stray magnetic fields.

The target can include a multipole magnet assembly having a plurality of magnetic pole pairs. The multipole magnet assembly can include a plurality of magnetic domains disposed in a cylindrical configuration, each having an opposite polarity with respect to an adjacent magnetic domain. The multipole magnet assembly can include or be configured as a ring magnet. The sensor can include a sum unit configured to receive an output signal from each magnetic field element and to subtract one magnetic field element output signal from the other. The sum unit can be configured to produce an output signal indicative of motion of the target relative to the first and second magnetic field directors, such that effects of stray magnetic fields on the first and second magnetic field sensing elements are mitigated. The output signal of the sum unit can be indicative of a linear response to angular displacement of the multipole magnet assembly relative to the first and second magnetic field directors.

The multipole magnet assembly can be coupled to the first rotatable shaft, and the first and second magnetic field directors can be coupled as a unit to the second rotatable shaft. The first rotatable shaft can be coupled to the second rotatable shaft by a torsion bar. The differential magnetic field sensor can be configured to measure torque applied to the first or second rotatable shafts. The first and second rotatable shafts can include or be part of a steering column. The first and second magnetic field directors can each include a plurality of teeth. The multipole magnet assembly can be configured as a toroidal body. The first and second magnetic field directors can each be disposed around a circumference of the toroidal body. The teeth of the first magnetic field director can be spaced apart from and interdigitated with the teeth of the second magnetic field director. The first and second magnetic field sensors can be coupled to a housing that is stationary relative to the first and second rotatable shafts. The first and second magnetic field concentrators can be coupled to the housing. The magnetic field sensing elements can be Hall effect elements. The magnetic field sensing elements can include magnetoresistance elements.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

DESCRIPTION OF THE SEVERAL VIEWS OF
THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 2C shows an enlarged view of an alternate embodiment of the magnetic field concentrators and interdigitated sections of the differential magnetic field torque sensor of FIG. 1, including shielding against stray magnetic fields;

DETAILED DESCRIPTION

Figure 1:
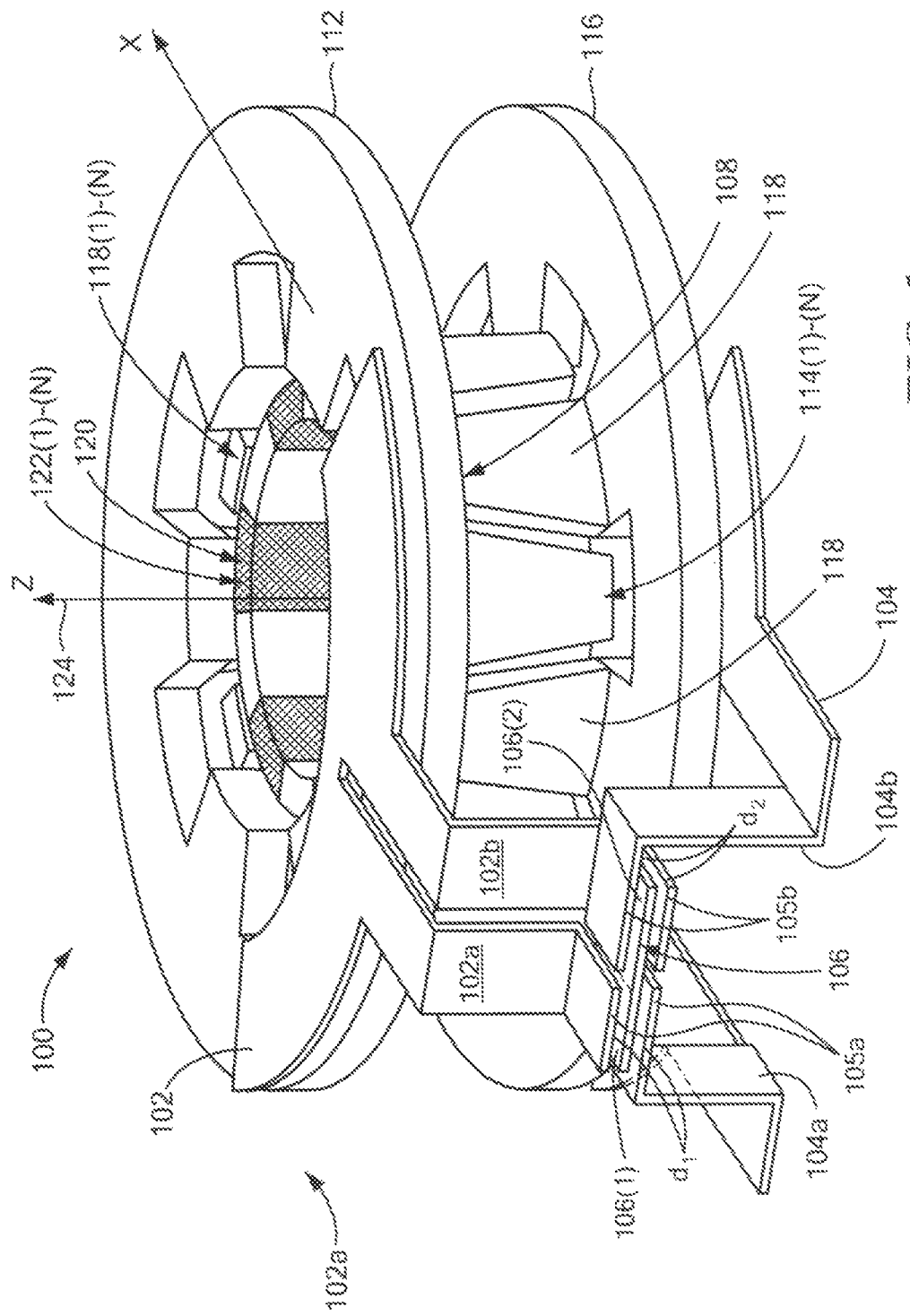
FIG. 1 is a diagram of an example magnetic field differential torque sensor, in accordance with the present disclosure.

Before describing example embodiments of the disclosure, some information is provided. As used herein, the term "magnetic field sensing element" refers to a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall effect element, and a vertical Hall effect element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (e.g., Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall effect elements tend to have axes of sensitivity perpendicular to a substrate, while metal based or metallic magnetoresistance elements (e.g., GMR, TMR, AMR) and vertical Hall effect elements tend to have axes of sensitivity parallel to a substrate.

As used herein, the term "magnetic field sensor" refers to an assembly that uses one or more magnetic field sensing elements in combination with an electronic circuit, typically all disposed upon a common substrate, e.g., a semiconductor substrate. Magnetic field sensors are used in a variety of applications, including, but not limited to, angle sensors that sense an angle of a direction of a magnetic field, angle sensors that sense an angle of rotation of a target object, and rotation sensors that sense rotation of a rotating target object (e.g., speed and direction of rotation).

Magnetic field sensors in the form of angle and/or rotation sensors that can sense an angle of rotation of a ferromagnetic object are described herein. As used herein, the term "magnetic field signal" is used to describe any circuit signal that results from a magnetic field experienced or sensed by a magnetic field sensing element.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/− ten degrees.

As used herein, the term "processor" or "processing unit" refers to an electronic circuit that performs a function, an operation, or a sequence of operations. The function, operation, or sequence of operations can be hard coded into the electronic circuit or soft coded by way of instructions held in a memory device. A "processor" or "processing unit" can perform the function, operation, or sequence of operations using digital values or using analog signals.

In some embodiments, the "processor" or "processing unit" can be embodied in an application specific integrated circuit (ASIC), which can be an analog ASIC or a digital ASIC. In some embodiments, the "processor" or "processing unit" can be embodied in a microprocessor with associated program memory. In some embodiments, the "processor" or "processing unit" can be embodied in a discrete electronic circuit, which can be analog or digital.

As used herein, the term "module" can describe a "processor." The term "module" can, however, be used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks (e.g., processors or modules), it will be understood that the analog blocks can be replaced by digital blocks (e.g., processors or modules) that perform the same or similar functions and the digital blocks can be replaced by analog blocks that perform the same or similar functions. Analog-to-digital or digital-to-analog conversions may not be explicitly shown in the figures but should be understood as being present.

In particular, it should be understood that a so-called comparator can be composed of an analog comparator having a two-state output signal indicative of an input signal being above or below a threshold level (or indicative of one input signal being above or below another input signal). The comparator can, however, also include or alternatively be composed of a digital circuit (e.g., processor or module) having an output signal or value with at least two states indicative of an input signal or value being above or below a threshold level (or indicative of one input signal or value being above or below another input signal or value), respectively, or a digital signal or value above or below a digital threshold signal or value (or another digital signal or value), respectively.

As used herein, the term "predetermined," when referring to a value or signal, refers to a value or signal that is set, or fixed, in the factory at the time of manufacture, or by external means, e.g., programming, thereafter. As used herein, the term "determined," when referring to a value or signal, refers to a value or signal that is identified by a circuit during operation, after manufacture.

As used herein, the term "amplifier" refers to a circuit element with a gain greater than one, less than one, or equal to one.

As used herein, the terms "line" and "linear" are used to describe either a straight line or a curved line. The line can be described by a function having any order less than infinite.

FIG. 1 is a diagram of an example differential magnetic field torque sensor 100 that is configured to reject stray magnetic fields, in accordance with embodiments of the present disclosure. Sensor 100 includes first and second magnetic field concentrators 102, 104, one or more magnetic field sensors 106, first and second magnetic field directors 112, 116, and a target 120. The magnetic field sensor 106 can include or be composed of sets or arrays of magnetic field sensing elements 106(1)-(2) positioned to detect magnetic field changes in a desired manner. In exemplary embodiments, the target 120 can be a multipole magnet assembly having a plurality of magnetic domains 122(1)-(N), e.g., configured as a ring magnet with alternating field orientations, as shown. The magnetic field directors 112, 116 can each have a plurality of teeth 114(1)-(N) and 118(1)-(N), respectively. The pluralities of teeth 114(1)-(N) and 118(1)-(N) can be spaced apart and interdigitated in a circular configuration, adjacent to the target 120. The magnetic field directors 112, 116 can be configured to be mounted as a unit to a rotatable shaft (not shown) while the target 120 can be configured to be mounted to a different rotatable shaft (not shown). The magnetic field concentrators 102, 104 and magnetic field sensor 106 can be fixed, e.g., mounted on or attached to a printed circuit board (PCB). Magnetic field directors 112, 116 and target 120 can rotate with respect to each other about a twist axis, shown as Z-axis 124.

The magnetic field concentrators 102, 104 have first and second sections (102a-b, 104a-b) that are offset from one another, e.g., such that they lie in parallel planes. Each section (e.g., 102a) of each concentrator 102, 104 is interdigitated with a section (e.g., 104a) of the other concentrator, forming two interdigitated pairs of sections 105a-b (i.e., 102a-104a and 102b-104b). The interdigitated section pairs 105a-b each include a gap between the ends of the sections $d_1$, $d_2$, respectively, for receiving a magnetic sensing element 106(1)-106(2). Each interdigitated section pair 105a-b may have a different configuration or orientation, as shown. For example, for interdigitated section pair 105a, section 102a from field concentrator 102 can be at a first location, e.g., along the Z-axis 124, and the section 104a from field concentrator 104 can be at a second position, e.g., along the Z-axis 124. In contrast, for the second interdigitated section pair 105b, the order of the sections can be switched such that the section 102b from concentrator 102 is at the second location along the Z-axis while the section 104b from concentrator 104 is at the first position along the Z-axis, as shown. The switching of the positions of the sections (i.e., the order of interdigitation) between the interdigitated section pairs 105a-b reverses the magnetic field within the gaps $d_1$, $d_2$. The interdigitated configuration of the magnetic field concentrators 102, 104 produces a differential magnetic field within the gaps $d_1$, $d_2$ (along the Z-axis 124) of the interdigitated section pairs 105a and 105b. Subtracting the signals produced by the magnetic sensing elements 106(1)-(2) provides linear response to the angle (of twist) between the target 120 and the magnetic field directors 112, 116 while tending to reject the deleterious effects of stray magnetic fields.

In operation of sensor 100, the magnetic field directors 112, 116 are caused to rotate (as a unit) relative to the target 120 about twist axis 124, e.g., due to a torque applied to a shaft to which the field directors 112, 116 or the target 120 are respectively mounted. As the magnetic field directors 112, 116 move relative to the target 120, a magnetic flux variation is generated in the adjacent teeth 114, 118 of the magnetic field directors 112, 116. The magnetic field directors 112, 116 affect (e.g., guide or direct) magnetic flux from the target 120 while the target 120 and magnetic field directors 112, 116 move with respect to each other. The magnetic field concentrators 102, 104 collect and/or concentrate magnetic flux from the magnetic field directors 112, 116 and provide the magnetic flux to the magnetic field sensor 106, completing a magnetic loop (magnetic circuit). The magnetic loop (formed by the target 120, magnetic field directors 112, 116, magnetic field concentrators 102, 104, and magnetic field sensor 106) results in a linear magnetic field response at the magnetic sensing elements 106(1)-(2) to angle differences between the target 120 and the magnetic field directors 112, 116. The linear magnetic field response can be detected by the magnetic field sensor 106 and an angle between the shafts can be calculated, e.g., by a processor (not shown) for a determination of applied torque, as described in further detail below.

In exemplary embodiments, the magnetic field directors 112, 116 and/or target 120 can rotate more than 360 degrees, e.g., such as a rotation range typical on a steering column with turning of a steering wheel in an automotive application. In example embodiments, a magnetic field sensor 106 can include two or more Hall effect elements configured so that the difference of the signals from the Hall effect elements can be used as differential signals that have magnetic stray-field effects reduced and/or removed by difference processing. In some embodiments, magnetic field sensor 106 can include two or more magnetic field sensors, each with two or more magnetic field sensing elements. In some embodiments, a magnetic field sensor 106 can include magnetoresistance sensors. While the target 120 is shown as having a plurality of magnetic domains 122(1)-(N), with each having an opposite polarity than its neighbors, in some embodiments, a target can 120 include plurality of magnetic domains separated by regions that do not have magnetic polarity, e.g., magnets spaced apart around a ferromagnetic yoke.

It should be understood that while the set of magnetic field concentrators 102, 104 is shown as providing a pair of interdigitated sections 105a-b used with a single magnetic field sensor 106, in other embodiments, the concentrators 102, 104 may be configured with additional similar or duplicate structures (e.g., 105a-b), each used with a respective additional magnetic field sensor 106. Such additional structure(s) can be used, e.g., for providing redundancy. In exemplary embodiments, sensor 100 may be utilized as a torque measurement sensor for an electric power assisted steering (APAS) system for automobile applications.

Figure 2A:
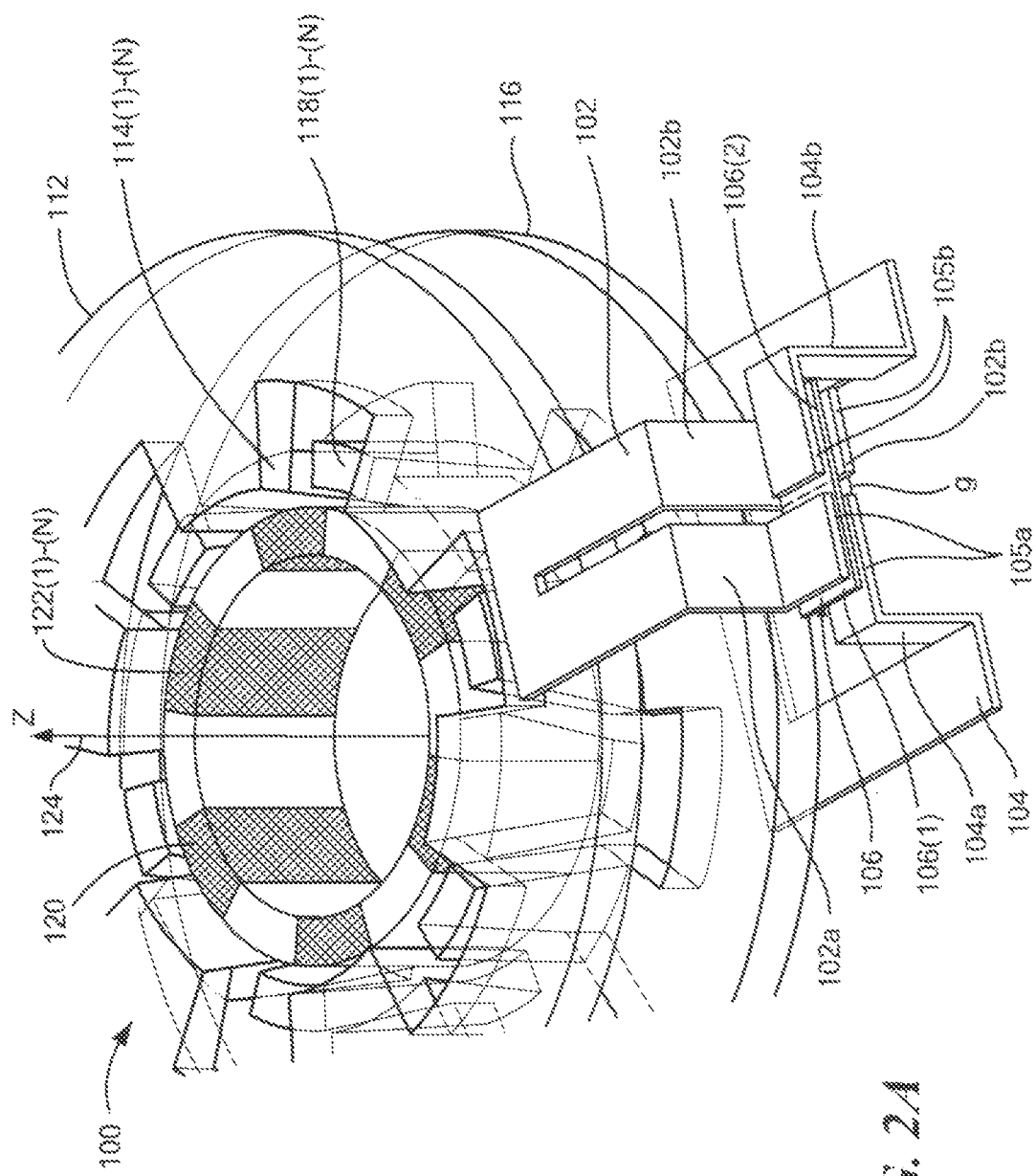
FIG. 2A shows an enlarged view of a portion of the differential magnetic field torque sensor of FIG. 1.

FIG. 2A shows an enlarged view of a portion of the differential magnetic field sensor 100 of FIG. 1. Magnetic field directors 112, 116 are shown configured for rotation relative to target 120 that is configured as a ring magnet. The magnetic field directors 112, 116 include a plurality of teeth 114(1)-(N), 118(1)-(N), respectively, which are interdigitated (or meshed) in a circular arrangement about a radial surface of the target 120. The target 120 can include a plurality of magnetic domains 122(1)-(N) (N-S orientations), indicated by the presence or absence of shading) disposed in a cylindrical configuration, each having an opposite polarity with respect to an adjacent magnetic domain. The magnetic field directors 112, 116 are configured for coupling as a unit to a shaft or other element (not shown) that is rotatable about a twist axis, e.g., parallel to Z-axis 124. The target 120 is configured for coupling to a different shaft or other element (not shown) that is rotatable about a twist axis, e.g., parallel to Z-axis 124. The lateral portions of magnetic field concentrators 102, 104 (shown in FIG. 1 extending adjacent portions of magnetic field directors 112, 116) are omitted for ease of viewing and explanation.

It some embodiments, it may be desirable to minimize or prevent, e.g., to an extent possible, magnetic flux flowing from one interdigitated section pair, e.g., 105a, to the other interdigitated section pair. Accordingly, the interdigitated section pairs 105a-b may be spaced apart, as noted by gap g in a direction orthogonal to the Z-axis 124, and/or the spacing between sections of the interdigitated section pairs 105a-b (e.g., $d_1$ and $d_2$ in FIG. 1) may be relatively small. Moreover, the magnetic field concentrators 102, 104 may be relatively thin to promote magnetic flux from flowing from one section, e.g., 102a, to the other section, e.g., 104a, of an interdigitated section pair, e.g., 105a, through the related magnetic field sensing element, e.g., 106(1). In some embodiments, portions of the magnetic field concentrators 102, 104 that are not included in the interdigitated section pairs 105a-b, e.g., portions that are not adjacent magnetic field sensing elements 106(1)-(2) and are not overlapping in the direction of the Z-axis 124, may be spaced further apart (than as for the interdigitated section pairs 105a-b) to reduce undesired flow of magnetic flux outside of the interdigitated section pairs 105a-b and/or to increase desired flow of magnetic flux through the magnetic field sensing elements 106(1)-(2).

Figure 2B:
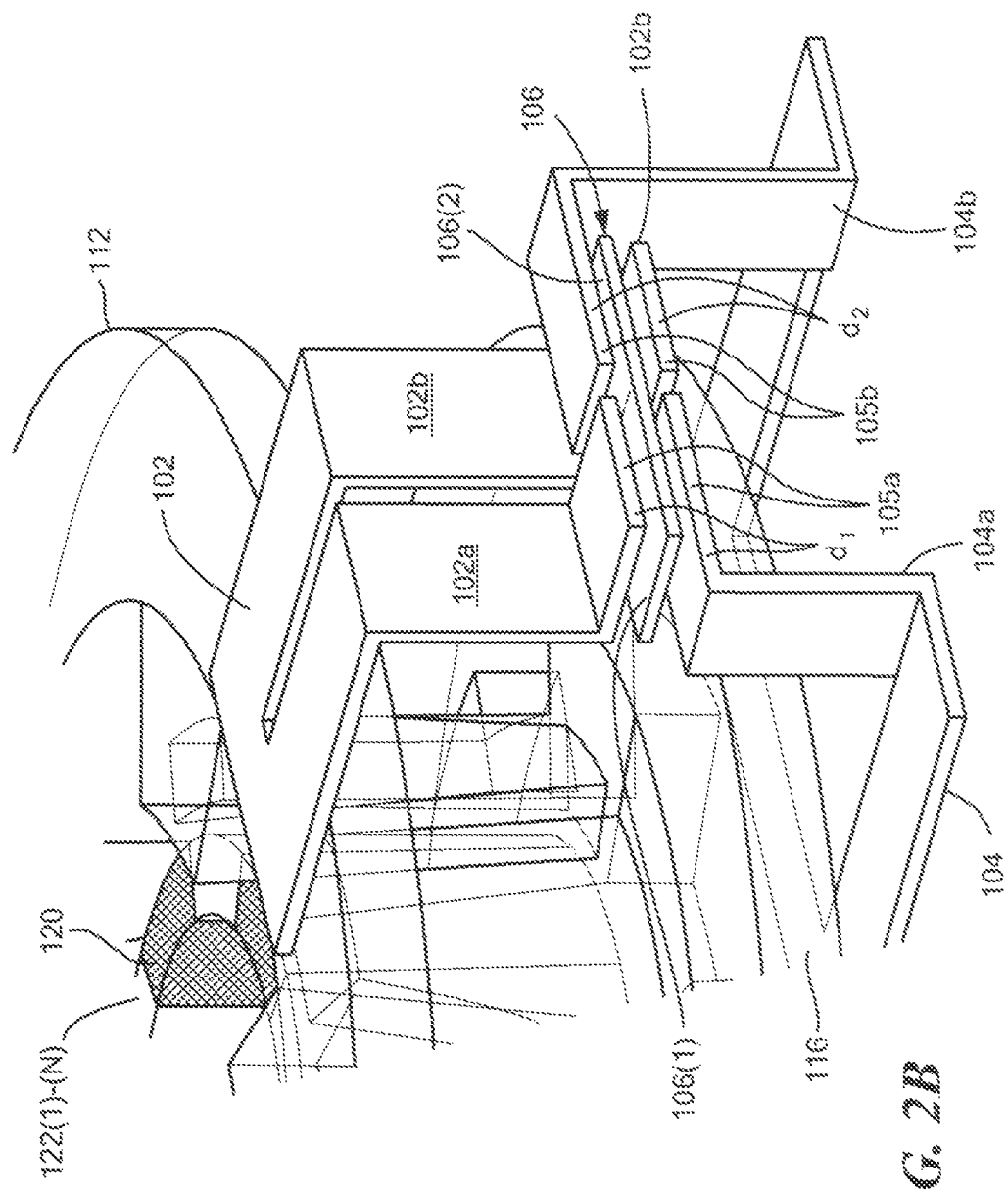
FIG. 2B shows an enlarged view of the magnetic field concentrators and interdigitated sections of the differential magnetic field torque sensor of FIG. 1.

FIG. 2B shows an enlarged view of the magnetic field concentrators 102, 104 and interdigitated section pairs 105a-b and magnetic field sensor 106 of FIG. 1. As with FIG. 2A, the lateral portions of magnetic field concentrators 102, 104 are removed for ease of viewing and explanation. Magnetic field sensor 106 includes magnetic field sensing elements 106(1)-106(2), which are disposed between or received by interdigitated section pairs 105a-b, respectively. Magnetic field sensing element 106(1) is shown disposed in a gap (indicated by $d_1$) between interdigitated sections 102a and 104a while magnetic field sensing element 106(2) is shown disposed in a gap (indicated by $d_2$) between interdigitated sections 102b and 104b. In exemplary embodiments, the gaps $d_1$ and $d_2$ are the same or substantially the same. As noted above, magnetic field sensor 106 can be mounted on a PCB (not shown). It should be understood that the interdigitated section pairs 105a-b and magnetic field sensor 106 can be arranged in different configurations as desired, depending on a particular application. For one example, the interdigitated section pairs could be rotated by, e.g., 90 degrees from the configuration shown. For another example, the interdigitated section pairs 105*a*-*b* could be offset in a radial direction (instead of along the Z-axis), receiving the magnetic field sensor 106 in a configuration that is generally parallel to the plane of the drawing.

FIG. 2C shows an enlarged view of an alternate embodiment of the magnetic field concentrators 102, 104 and interdigitated sections 102*a*-104*a*, 102*b*-104*b* of the differential magnetic field torque sensor 100 of FIG. 1, including shielding against stray magnetic fields. As shown, in example embodiments, shields (shielding elements) 130*a*-*b* can be used to provide further mitigation or prevention of deleterious effects due to stray magnetic fields ($B_{SF}$). Such stray magnetic fields ($B_{SF}$) may be generated by, e.g., conductive elements that are close to the magnetic field sensing elements 106(1)-(2) of the differential magnetic field torque sensor 100. Representative conductive element (wire) 140 is shown as carrying a current (i) and generating a magnetic field presented to sensor 100 as a stray magnetic field ($B_{SF}$). Shields 130*a*-*b* can be formed or positioned on magnetic field concentrators 102, 104 to prevent or minimize stray magnetic fields, e.g., ($B_{SF}$), from passing through magnetic field sensing elements 106(1)-(2).

In example embodiments, a shield, e.g., 130*a*, may be used with an interdigitated section 104*a* of one interdigitated section pair 105*a* to bracket the other interdigitated section 102*a* and the corresponding magnetic field sensing element 106(1). When used for an interdigitated section pair, each shield can accordingly shield the respective magnetic sensing element from stray magnetic fields. For example, shield 130*a* is shown connected to magnetic field concentrator 104 at interdigitated section 104*a* while shield 130*b* is shown connected to magnetic field concentrator 102 at interdigitated section 102*b*. In the embodiment shown, interdigitated section 102*a* and shield 130*a* are not in contact at plane section 150, though the perspective of the drawing may obscure that feature. By providing a conductive path on the magnetic field concentrator 102, 104, respectively, the shields 130*ab* can allow the stray magnetic field ($B_{SF}$) to be conducted around the magnetic field sensing elements 106(1)-(2) as opposed to through them.

To facilitate sensing of magnetic flux from the target 120, a shield, e.g., 130*a*, may be positioned so that a distance from the shield 130*a* (as used with or mounted to one interdigitated section 104*a*) to the other interdigitated section 102*a* of the related interdigitated section pair 105*a* (distance shown as $d_3$, $d_4$) is greater than the distance ($d_1$, $d_2$) between the interdigitated sections 102*a*, 104*a* of the interdigitated section pair 105*a*. Thus, magnetic flux from target 120 will accordingly be provided with higher reluctance (magnetic resistance) along paths between the magnetic field concentrators 102, 104 and the shields 130*a*-*b* than along the intended path between the interdigitated sections of the interdigitated section pairs 105*a*-*b* and through the magnetic field sensing elements 106(1)-(2). Of course, shields 130*a*-*b* can have alternate configurations and/or shapes in other embodiments of the present disclosure, e.g., shield 130*a* could be connected to interdigitated section 102*a* while shield 130*b* could be connected to interdigitated section 104*b*, etc.

Figure 3:
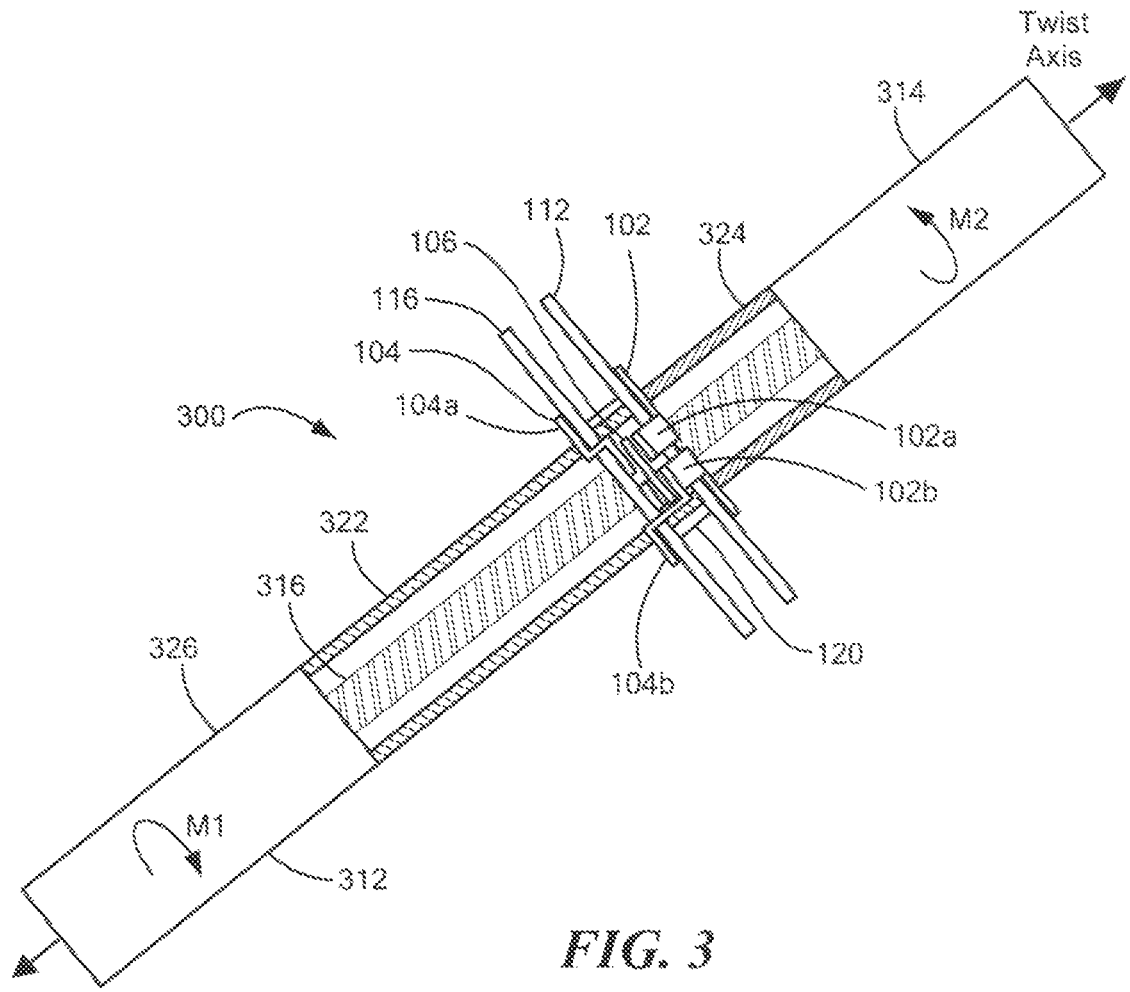
FIG. 3 is a diagram of an exemplary embodiment of a magnetic field differential torque sensor in a side-shaft configuration, in accordance with the present disclosure.

FIG. 3 shows an example differential magnetic field torque sensor 300 in a side-shaft configuration, in accordance with exemplary embodiments of the present disclosure. The sensor 300 is generally similar to sensor 100 of FIG. 1 and is mounted adjacent a shaft assembly that includes two (first and second) rotatable shafts 312, 314 connected by an intermediate elastic element 316 (e.g., torsion bar).

The sensor 300 includes first and second magnetic field concentrators 102, 104 and a magnetic field sensor 106 mounted on a suitable support or substrate (not shown), e.g., a printed circuit board (PCB), adjacent to magnetic field directors 112, 116 and target 120. In exemplary embodiments, the target 120 may be a ring magnet having a plurality of alternating magnetic domains or poles, e.g., formed by separate and joined magnets or by differently magnetized portions of a unitary ring structure. The magnetic field directors 112, 116 (as a unit) and target 120 can be coupled to the first and second shafts 312 and 314, e.g., by sheaths (sleeves or extensions) 322, 324, respectively. As noted above, the first and second shafts 312 and 314 can be connected by an elastic member 316, e.g., a torsion bar.

The torsion bar 316 can be used to increase the angle signal strength and/or signal-to-noise ratio (S/N) for angle measurement by creating a larger angle of twist (which is easier to measure/detect) from a given applied torque on the first or second shafts 312, 314. The torsion bar 316 can be designed, by appropriate geometry and/or material selection (e.g., use of a particular metal alloy) to twist through a specific range of angles for typical applied loads. The sheaths 322, 324 allow the target 120 and magnetic field directors 112, 116 to be mounted close to each other even though the actual portions of the first and second shafts 312, 314 to which they are respectively attached are separated by a longer distance, facilitating measurement of the relative angle between the shafts 312, 314. Though not shown, other associated circuits and components, e.g., one or more processors, can be included on or connected to the support.

In operation of sensor 300, as a torque is applied to either shaft 312 or 314, the torque is transferred through the elastic element 316 (e.g., torsion bar) to the other shaft. The torsion bar 316 undergoes an amount of twist (more extreme than otherwise would occur in its absence) and the connected shafts 312, 314 are rotated accordingly with respect to one another about the twist axis by some angle (e.g., theta). The target 120 and magnetic field directors 112, 116, which, while adjacent to one another for angle measurement, are connected to the separate shafts 312, 314 and accordingly undergo the same angular shift with respect to one another (e.g., theta) as do shafts 312, 314. Magnetic field sensor 106, including magnetic field sensing elements 106(1)-(2), detects the angular shift between the magnetic field directors 112, 116 and target 120, producing output signals corresponding to the angular shift, as described above for FIG. 1. In exemplary embodiments, system 300 may be utilized as a torque measurement sensor for an electric power assisted steering (APAS) application for an automobile, with shafts 312, 314 and elastic element 316 being components of a steering column.

With continued reference to FIG. 3, a processor (not shown) or other component can receive the output signals corresponding to the angular shift (angle). By multiplying that angle by a system defined factor k, the applied torque can be obtained. Defined factor k may be, e.g., related to the modulus of rigidity of the material(s) and/or geometry (moment of inertia) of the elastic element 316 and/or shafts 312, 314.

Figure 4:
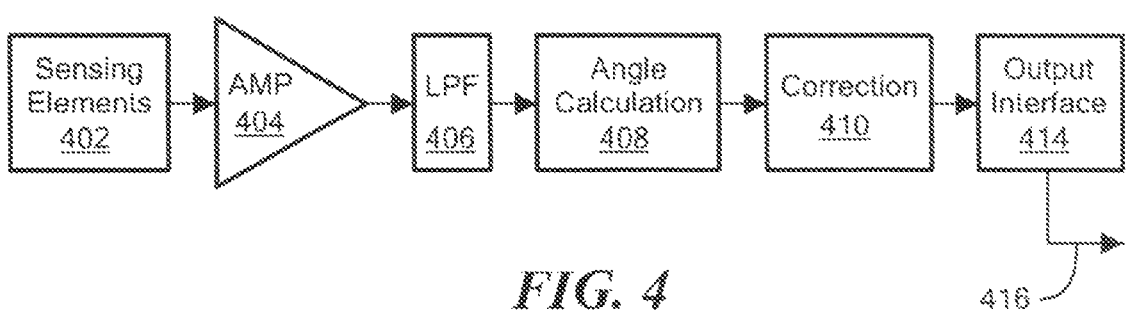
FIG. 4 is a circuit schematic of an example magnetic field differential linear torque sensor, in accordance with the present disclosure.

FIG. 4 shows an example block diagram of a magnetic field sensor 400 having magnetic field sensing elements positioned to detect a magnetic target (e.g., 120 of FIG. 1), in accordance with exemplary embodiments of the present disclosure.

The sensor 400 includes magnetic field sensing elements 402 (e.g., magnetic field sensing elements 106(1)-(2) of FIG. 1) to detect changes in a magnetic field caused by a moving target, such as a rotating multipole magnet assembly. In example embodiments, the magnetic field sensing elements 402 include Hall effect elements configured so that the difference of their respective Hall effect signals can be sensed. An amplifier circuit 404 can amplify the differential voltage signals from the sensing elements for filtering by a low pass filter 406. Chopping techniques can be used to reduce or eliminate offset. An angle calculation module 408 can determine an angle from the sensing element differential signals which are stray field immune. A correction module 410 can provide various types of correction to the angle output signal from the angle calculation module 408. An output interface module 414 can produce an output signal 416 with output information in one or more formats to meet the needs of a particular application.

From the differential magnetic field signals, ARCTAN ($\tan^{-1}$) processing—such as by a processor included in the sensor or by a processor such as DSP—can be performed to determine an angle of rotation between the magnetic field directors and the target. In some embodiments, the ARCTAN processing can be implemented by coordinate-rotation-digital-computer (CORDIC) processing. In example embodiments, the sensor output signal 416 (e.g., including an angle or torque measurement value) can be provided with serial peripheral interface (SPI), single edge nibble transmission (SENT), puke-width modulation (PWM), and/or analog output formats.

Figure 5:
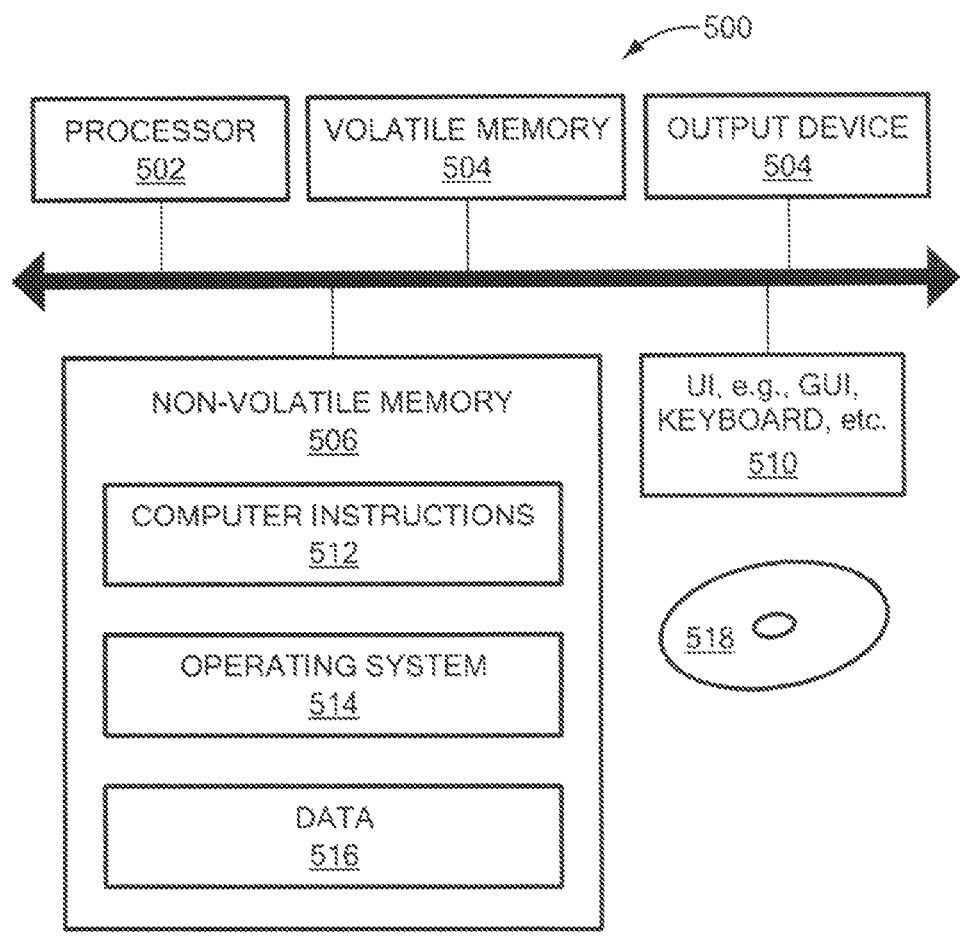
FIG. 5 is a block diagram of an example computer system operative to perform processing, in accordance with the present disclosure.

FIG. 5 a block diagram of an example computer system 500 operative to perform processing in accordance with the present disclosure. The computer system 500 can perform all or at least a portion of the processing, e.g., steps in the algorithms, equations, and/or methods described herein. The computer system 500 includes a processor 502, a volatile memory 504, a non-volatile memory 506 (e.g., hard disk), an output device 507 and a user input or interface (UI) 508, e.g., graphical user interface (GUI), a mouse, a keyboard, a display, or any common user interface, etc. The non-volatile memory (non-transitory storage medium) 506 stores computer instructions 512 (a.k.a., machine-readable instructions or computer-readable instructions) such as software (computer program product), an operating system 516, and data 518. In one example, the computer instructions 512 are executed by the processor 502 out of (from) volatile memory 504. In one embodiment, an article 520 (e.g., a storage device or medium such as a hard disk, an optical disc, magnetic storage tape, optical storage tape, flash drive, etc.) includes or stores the non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 500 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. The programs, however, may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

Accordingly, embodiments of the disclosure can afford benefits relative to prior art techniques. Such benefits may include, but are not limited to, providing systems, sensors, and techniques that employ contactless angle measurement and/or torque sensing that is resistant to and/or tends to reject stray magnetic fields and the deleterious effects of such stray magnetic fields. Such contactless angle measurement and/or torque sensing can be performed for various types of objects and in various applications. For example, such measurements and sensing can be accomplished for shafts that are only slowly rotating or that rotate through only a small angle, e.g., including zero (0) rpm and for angles less than, e.g., 15 degrees, 10 degrees, 5 degrees, 2 degrees, 1 degree, etc. Embodiments of the present disclosure can provide for magnetic stray field robust angle and/or torque measurement with fewer and less expensive parts than conventional systems and techniques.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, which includes a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal," "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and conducted in various ways.

Also, the phraseology and terminology used herein are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A differential magnetic field torque sensor, the sensor comprising:
a multipole magnet assembly configured for coupling to a first rotatable shaft having a first axis of rotation;
first and second magnetic field directors positioned adjacent the multipole magnet assembly and configured to affect magnetic flux from the multipole magnet assembly, wherein the first and second magnetic field directors are configured for coupling as a unit to a second rotatable shaft having a second axis of rotation aligned with the first axis of rotation;
first and second magnetic field concentrators configured to concentrate the magnetic flux from the multipole magnet assembly, wherein each magnetic field concentrator has first and second offset sections that are offset from one another in a direction transverse to the first axis of rotation, wherein the first and second offset sections of the first magnetic field concentrator are at different positions respectively in a direction parallel to the first axis of rotation, and wherein the first and second offset portions of the second magnetic field concentrator are at different positions respectively in a direction parallel to the first axis of rotation;

first and second interdigitated section pairs, each including an offset section of the first magnetic field concentrator configured with an offset portion of the second magnetic field concentrator in a respective orientation, and wherein the second interdigitated section pair has a reversed orientation relative to that of the first interdigitated section pair; and a magnetic field sensor having first and second magnetic field sensing elements, each configured to measure magnetic flux and to produce an output signal based on measured changes in magnetic flux due to relative angular motion between the multipole magnet assembly and the first and second magnetic field directors, wherein the output signal is indicative of torque applied to the first or second rotatable shafts;

wherein each of the first and second interdigitated section pairs is configured to receive a respective magnetic field sensing element.

2. The sensor of claim 1, wherein the first shaft is coupled to the second shaft by an elastic member.

3. The sensor of claim 2, wherein the elastic member comprises a torsion bar.

4. The sensor of claim 1, wherein the multipole magnet assembly is configured as a ring magnet and includes a plurality of magnetic domains disposed in a cylindrical configuration, each having an opposite polarity with respect to an adjacent magnetic domain.

5. The sensor of claim 1, wherein the first and second magnetic field directors each include a plurality of teeth.

6. The sensor of claim 5, wherein the multipole magnet assembly is configured as a toroidal body, wherein the first and second magnetic field directors are each disposed around a circumference of the toroidal body, and wherein the teeth of the first magnetic field director are spaced apart from and interdigitated with the teeth of the second magnetic field director.

7. The sensor of claim 1, wherein the magnetic field sensor is coupled to a housing that is stationary relative to the first and second rotatable shafts.

8. The sensor of claim 7, wherein the first and second magnetic field concentrators are coupled to the housing.

9. The sensor of claim 1, further comprising a sum unit configured to receive an output signal from each magnetic field sensing element and to subtract one magnetic field element output signal from the other, wherein the sum unit is configured to produce an output signal indicative of angular displacement of the multipole magnet assembly relative to the first and second magnetic field directors, and wherein effects of stray magnetic fields on the first and second magnetic field sensing elements are mitigated.

10. The sensor of claim 1, wherein the first and second rotatable shafts comprise a steering column.

11. The sensor of claim 1, wherein the magnetic field sensing elements comprise Hall effect elements.

12. The sensor of claim 1, wherein the magnetic field sensing elements comprise magnetoresistance elements.

13. The sensor of claim 1, wherein each interdigitated section pair further comprises a shield configured to shield the respective magnetic sensing element from stray magnetic fields.

14. A differential magnetic field sensor, the sensor comprising:
a target configured for coupling to a first rotatable shaft having a first axis of rotation;
first and second magnetic field directors positioned adjacent the target and configured to affect magnetic flux from the target, wherein the first and second magnetic field directors are configured for coupling as a unit to a second rotatable shaft having a second axis of rotation aligned with the first axis of rotation;

first and second magnetic field concentrators configured to concentrate the magnetic flux from the target, wherein each magnetic field concentrator has first and second offset sections that are offset from one another in a direction transverse to the first axis of rotation, wherein the first and second offset sections of the first magnetic field concentrator are at different positions respectively in a direction parallel to the first axis of rotation, and wherein the first and second offset portions of the second magnetic field concentrator are at different positions respectively in a direction parallel to the first axis of rotation;

first and second interdigitated section pairs, each including an offset section of the first magnetic field concentrator configured with an offset portion of the second magnetic field concentrator in a respective orientation, and wherein the second interdigitated section pair has a reversed orientation relative to that of the first interdigitated section pair; and a magnetic field sensor having first and second magnetic field sensing elements, each configured to measure magnetic flux and to produce an output signal indicative of measured changes in magnetic flux due to relative angular motion between the target and the first and second magnetic field directors;

wherein each of the first and second interdigitated section pairs is configured to receive a respective magnetic field sensing element.

15. The sensor of claim 14, wherein the target comprises a multipole magnet assembly having a plurality of magnetic pole pairs.

16. The sensor of claim 15, wherein the multipole magnet assembly includes a plurality of magnetic domains disposed in a cylindrical configuration, each having an opposite polarity with respect to an adjacent magnetic domain.

17. The sensor of claim 15, wherein the multipole magnet assembly comprises a ring magnet.

18. The sensor of claim 15, wherein the multipole magnet assembly is coupled to the first rotatable shaft, and wherein the first and second magnetic field directors are coupled as a unit to the second rotatable shaft, wherein the first rotatable shaft is coupled to the second rotatable shaft by a torsion bar, and wherein the differential magnetic field sensor is configured to measure torque applied to the first or second rotatable shafts.

19. The sensor of claim 18, wherein the first and second rotatable shafts comprise a steering column.

20. The sensor of claim 15, wherein the first and second magnetic field directors each include a plurality of teeth.

21. The sensor of claim 20, wherein the multipole magnet assembly is configured as a toroidal body, wherein the first and second magnetic field directors are each disposed around a circumference of the toroidal body, and wherein the teeth of the first magnetic field director are spaced apart from and interdigitated with the teeth of the second magnetic field director.

22. The sensor of claim 14, further comprising a sum unit configured to receive an output signal from each magnetic field sensing element and to subtract one magnetic field element output signal from the other, wherein the sum unit is configured to produce an output signal indicative of an angle of the target relative to the first and second magnetic field directors, and wherein effects of stray magnetic fields on the first and second magnetic field sensing elements are mitigated.

23. The sensor of claim 22, wherein the output signal of the sum unit is indicative of a linear response to an angle of the multipole magnet assembly relative to the first and second magnetic field directors.

24. The sensor of claim 14, wherein the first and second magnetic field sensors are coupled to a housing that is stationary relative to the first and second rotatable shafts.

25. The sensor of claim 24, wherein the first and second magnetic field concentrators are coupled to the housing.

26. The sensor of claim 14, wherein the magnetic field sensing elements comprise Hall effect elements.

27. The sensor of claim 14, wherein the magnetic field sensing elements comprise magnetoresistance elements.

28. The sensor of claim 14, wherein each interdigitated section pair further comprises a shield configured to shield the respective magnetic sensing element from stray magnetic fields.

* * * * *